United States Patent

[11] 3,577,791

| [72] | Inventor | Jan Abraham Vanden Broek |
| | | Ann Arbor, Mich. |
| [21] | Appl. No. | 792,949 |
| [22] | Filed | Jan. 22, 1969 |
| [45] | Patented | May 4, 1971 |
| [73] | Assignee | Conductron Corporation |
| | | St. Charles, Mo. |

[54] CONTROL SYSTEM
7 Claims, 6 Drawing Figs.

[52] U.S. Cl. .................................................. 74/89.15, 350/289
[51] Int. Cl. ...................................................... F16h 27/02
[50] Field of Search .......................................... 74/89.15; 350/289; 248/481, 485, 487

[56] References Cited
UNITED STATES PATENTS

| 2,906,292 | 9/1959 | Mayo | 350/289 |
| 3,204,471 | 9/1965 | Rempel | 74/89.15 |
| 3,357,268 | 12/1967 | Richter | 74/89.15 |
| 3,359,812 | 12/1967 | Everitt | 74/89.15 |
| 3,407,018 | 10/1968 | Miller | 74/89.15 |

Primary Examiner—Fred C. Mattern, Jr.
Assistant Examiner—Wesley S. Ratliff, Jr.
Attorney—Kingsland, Rogers, Ezell, Eilers and Robbins ABSTRACT: A mount for a optical element has a stationary base, a mounting plate, and four interacting surfaces carried by that base and mounting plate. One of those interacting surfaces provides an essentially fixed spacing between predetermined areas on the base and mounting plate, a second of those interacting surfaces coacts with said one of those interacting surfaces to permit adjustment of the mounting plate relative to the base about one axis, a third of those interacting surfaces coacts with said one of those interacting surfaces to permit adjustment of the mounting plate relative to the base about a second axis, and the fourth of those interacting surfaces coacts with said one of those interacting surfaces to prevent rotation of the mounting plate in its own plane relative to the base.

Patented May 4, 1971  3,577,791
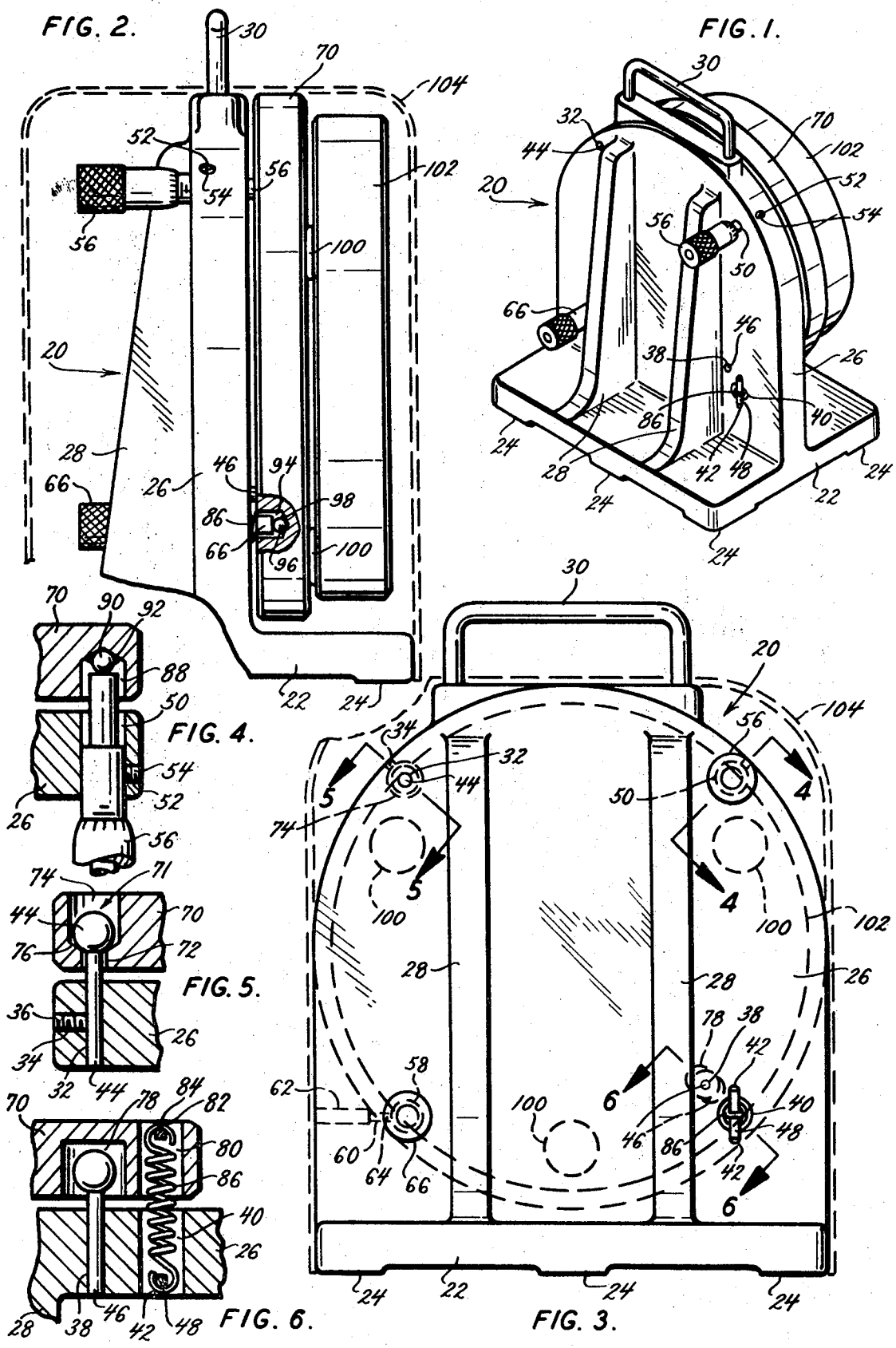

CONTROL SYSTEM

This invention relates to improvements in Control Systems. More particularly, this invention relates to improvements in mounts for optical elements.

It is, therefore, an object of the present invention to provide an improved mount for an optical element.

It frequently is necessary to adjust the position of an optical element with precision; and, in recognition of that fact, mounts have been proposed which would permit adjustments of the positions of optical elements about orthogonal axes. Some of those mounts have been complicated and expensive, and other of those mounts have not provided the desired degree of precision. As a result, it would be desirable to provide a mount for an optical element which was simple and inexpensive but which permitted the position of that optical element to be adjusted about orthogonal axes. The present invention provides such a mount; and it is, therefore, an object of the present invention to provide a mount for an optical element which is simple and inexpensive but which permits adjustment of the position of that optical element about orthogonal axes.

The mount provided by the present invention has a mounting plate to which an optical element can be secured, and it has a base which adjustably supports that mounting plate. A ball and a recessed surface coact to constitute a means of essentially fixing the spacing between a predetermined area on the base and a predetermined area on the mounting plate, a second ball and the screw of a micrometer coact to constitute an adjustable means which adjustably sets the spacing between a second predetermined area on the base and a second predetermined area on the mounting plate, and a third ball and the screw of a second micrometer coact to constitute a second adjustable means which adjustably sets the spacing between a third predetermined area on the base and a third predetermined area on the mounting plate. The first ball and the recessed surface coact with the second ball and the first micrometer to define an axis about which the position of the mounting plate can be adjusted, and that first ball and that recessed surface coact with the third ball and the second micrometer to define a second axis about which the position of the mounting plate can be adjusted; and those axes are spaced apart ninety degrees. As a result, the mount provided by the present invention can provide precise adjustment of the position of the mounting plate about orthogonal axes. It is, therefore, an object of the present invention to provide a mount which includes a mounting plate to which an optical element can be secured, a base which adjustably supports that mounting plate, a ball and a recessed surface that essentially fix the spacing between a predetermined area on that base and a predetermined area on that mounting plate, a second ball and a micrometer that adjustably set the spacing between a second predetermined area on the base and a second predetermined area on the mounting plate, and a third ball and a second micrometer that adjustably set the spacing between a third predetermined area on the base and a third predetermined area on the mounting plate.

Other and further objects and advantages of the present invention should become apparent from an examination of the drawing and accompanying description.

In the drawing and accompanying description a preferred embodiment of the present invention is shown and described but it is to be understood that the drawing and a accompanying description are for the purpose of illustration only and do not limit the invention and that the invention will be defined by the appended claims.

In the drawing, FIG. 1 is a perspective view of one preferred embodiment of mount that is made in accordance with the principles and teachings of the present invention.

FIG. 2 is a partially broken-away, side elevational view, on a larger scale, of the mount shown in FIG. 1, FIG. 3 is a partially broken-away, rear elevational view, on the scale of FIG. 2, of the mount shown in FIG. 1, FIG. 4 is a sectional view, on a still larger scale, through the mount of FIG. 1, and it is taken along the plane indicated by the line 4-4 in FIG. 3, FIG. 5 is a sectional view, on the scale of FIG. 4, through the mount of FIG. 1, and it is taken along the plane indicated by the line 5-5 in FIG. 3, and FIG. 6 is a further sectional view, on the scale of FIG. 4, through the mount of FIG. 1, and it is taken along the plane indicated by the line 6-6 in FIG. 3.

Referring to the drawing in detail, the numeral 20 generally denotes the base of one preferred form of mount that is made in accordance with the principles and teachings of the present invention. That base has a horizontally directed portion 22 with 6 feet 24 depending downwardly therefrom; and it has a vertically directed portion 26 which extends upwardly from the horizontally directed portion 22. The numeral 28 denotes two vertically directed webs which abut the rear face of the vertically directed portion 26 and which abut the upper face of the horizontally directed portion 22. The numeral 30 denotes a handle which extends upwardly from the upper surface of the vertically directed portion 26. The base 20 can be cast or can be fabricated; but, in either event, that base will be made so it is sturdy and strong and so it will not flex or vibrate.

The numeral 32 denotes a cylindrical passage which is formed in the vertically directed portion 26 of the base 20; and that passage is horizontally directed, is located in the upper left-hand area of that vertically directed portion as shown by FIGS. 1 and 3, and is of constant diameter as shown by FIG. 5. A short threaded opening 34 extends inwardly from the periphery of the vertically directed portion 26 to communicate with the cylindrical passage 32. The threaded opening 34 receives a set screw 36; and rotation of that set screw relative to that threaded opening can cause the inner end of that set screw to enter the cylindrical passage 32.

A cylindrical passage 38 is formed in the vertically directed portion 26 of the base 20; and that passage is horizontally directed, is located in the lower right-hand area of that vertically directed portion as shown by FIGS. 1 and 3, and is of constant diameter as shown by FIG. 6. The cylindrical passage 32 is located adjacent the upper end of a diameter of the vertically directed portion 26, while the cylindrical passage 38 is located adjacent the lower end of that diameter as shown by FIG. 3.

The numeral 40 denotes a further cylindrical passage in the vertically directed portion 26 of the base 20; and that passage is horizontally directed, is located in the lower right-hand area of that vertically directed portion as shown by FIGS. 1 and 3, and is located on the same diameter on which the cylindrical passages 32 and 38 are located. As shown by FIGS. 1 and 3, the passage 40 is located radially outwardly of the passage 38. A slotlike recess 42 is formed in the rear face of the vertically directed portion 26 of the base 20; and that slotlike recess communicates with and intersects the passage 40, as shown by FIGS. 1, 3 and 6.

The numeral 44 denotes a pin with a ball on the forward end thereof; and the shank of that pin is held within the cylindrical passage 32 by the set screw 36, as shown by FIG. 5. The ball on the forward end of the pin 44 extends forwardly of the front face of the vertically directed portion 26 of the base 20. The numeral 46 denotes a pin with a ball on the forward end thereof; and the shank of that pin is disposed within the cylindrical passage 38, as shown by FIG. 6. While the shank of the pin 46 could be secured within the cylindrical passage 38 in various ways, a cement such as an epoxy cement has been found to be very useful in securing the shank of that pin within that passage. The ball on the forward end of the pin 46 extends forwardly of the front face of the vertically directed portion 26. The numeral 48 denotes a cylindrical pin which is disposed within the slotlike recess 42 adjacent the passage 40. As shown particularly by FIGS. 1, 3 and 6, the pin 48 is disposed within and intersects the rear end of the passage 40.

The numeral 50 denotes a cylindrical passage which is formed in the vertically directed portion 26 of the base 20, and that passage is horizontally directed, is located in the upper right-hand area of that vertically directed portion as shown by FIGS. 1 and 3, and is of constant diameter as shown by FIG. 4. A short, threaded opening 52 extends inwardly from the periphery of the vertically directed portion 26 to communicate with the cylindrical passage 50. A set screw 54 is mounted within the short, threaded opening 52; and rotation of that set screw can cause the inner end of that set screw to enter the cylindrical passage 50. The numeral 56 denotes a micrometer which has the barrel thereof disposed within the passage 50; and the inner end of the set screw 54 engages that barrel to fixedly hold that barrel against movement relative to the vertically directed portion 26 of the base 20. The axis of the passage 50 and the axis of the passage 32 are spaced the same distance above the upper surface of the horizontally directed portion 22 of the base 20; and hence they intersect, and define the position of, a horizontal line which is located above, and parallel to, that upper surface.

The numeral 58 denotes a further cylindrical passage in the vertically directed portion 26 of the base 20; and that passage is horizontally directed, is located in the lower left-hand area of that vertically directed portion as shown by FIG. 3, and is of constant diameter. A short, threaded opening 60 is provided in the vertically directed portion 26; and that short, threaded opening communicates with the cylindrical passage 58. A larger diameter, access opening 62 extends outwardly from the outer end of the threaded opening 60 to the periphery of the vertically directed portion 26, as shown by FIG. 3. A set screw 64 is disposed within the threaded opening 60; and the access opening 62 is intended to permit a wrench or a screw driver to engage and to rotate that set screw. Rotation of that set screw relative to that threaded opening will permit the inner end of that set screw to enter the cylindrical passage 58. The numeral 66 denotes a micrometer which has the barrel thereof disposed within the passage 58; and the inner end of the set screw 64 engages that barrel to fixedly hold that barrel against movement relative to the vertically directed portion 26 of the base 20. The axis of the passage 58 and the axis of the passage 32 intersect, and define the position of, a vertical line which is displaced ninety degrees from the horizontal line which has the position thereof defined by the axes of the passages 32 and 50.

The numeral 70 denotes a mounting plate which is circular in elevation; and that mounting plate is disposed a short distance forwardly of the forward face of the vertically directed portion 26 of the base 20, as shown by FIGS. 1 and 2. That mounting plate has a passage 71 therein which has a cylindrical portion 72, a larger diameter, cylindrical portion 74, and a frustoconical shoulder 76 intermediate the cylindrical portions 72 and 74, as shown by FIG. 5. The cylindrical portion 72 of the passage 71 has a diameter which is slightly larger than the diameter of the cylindrical passage 32 in the vertically directed portion 26 of the base 20; and the cylindrical portion 72 and the cylindrical passage 32 are coaxial. The larger diameter, cylindrical portion 74 of the passage 71 in the mounting plate 70 has a diameter which is slightly larger than the diameter of the ball on the forward end of the pin 44; and that ball is disposed within that cylindrical portion. The frustoconical shoulder 76 engages the rear face of the ball on the pin 44; and that frustoconical shoulder will coact with that ball and the set screw 36 to fix the maximum spacing between the confronting faces of the upper left-hand areas of the mounting plate 70 and of the vertically directed portion 26 of the base 20. However, that frustoconical shoulder and that ball will permit rotation of the mounting plate 70, relative to the base 20, about the horizontal line which has the position thereof defined by the axes of the cylindrical passages 32 and 50 and also about the vertical line which has the position thereof defined by the axes of the cylindrical passages 32 and 58.

The numeral 78 denotes a recess in the rear face of the mounting plate 70; and that recess is adjacent the lower end of the diameter of the mounting plate 70 which extends downwardly and to the right from the passage 71. As shown by FIG. 6, the recess 78 is in register with the cylindrical passage 38 in the vertically directed portion 26 of the base 20. The recess 78 is dimensioned so the width thereof is just slightly greater than the diameter of the ball at the forward end of the pin 46; and, as a result, that recess will coact with that ball to essentially prevent translation of the mounting plate 70, in the plane of that mounting plate in a direction transverse of the diameter on which that recess and the passage 71 lie, relative to the vertically directed portion 26 of the base 20. However, the recess 78 is dimensioned so the length thereof is appreciably greater than the diameter of that ball; and hence that recess will coact with that ball to permit limited translation of the mounting plate 70, in the plane of that mounting plate along that diameter.

The numeral 80 denotes a cylindrical passage in the mounting plate 70; and the axis of that passage intersects the diameter which the axes of the recess 78 and of the passage 71 intersect. The passage 80 is located radially outwardly of the recess 78, as shown particularly by FIG. 6; and that passage is in register with the passage 40 in the vertically directed portion 26 of the base 20. A slot-like recess 82 is formed in the front face of the mounting plate 70; and that slotlike recess communicates with, and intersects, the passage 80, as shown by FIG. 6. The numeral 84 denotes a pin which is lodged within the slot-like recess 82, and that pin is in register with the pin 48 in the slot-like recess 42 at the rear of the passage 40 in the vertically directed portion 26 of the base 20.

A helical extension spring 86 has the rear end thereof hooked around the pin 48, and has the forward end thereof hooked around the pin 84. That spring urges the confronting faces of the lower right-hand areas of the mounting plate 70 and of the vertically directed portion 26 of the base 20 toward each other; but that spring can yield to permit movement of those confronting faces away from each other. The recess 78 in the mounting plate 70 is deep enough, relative to the diameter of the ball on the pin 46, to permit such relative movement of the confronting faces of the lower right-hand areas of the mounting plate 70 and of the vertically directed portion 26 of the base 20.

The numeral 88 denotes a generally cylindrical recess in the mounting plate 70, and that recess has a conical inner end, as shown by FIG. 4. Also as shown by FIG. 4, that recess is in register with the cylindrical passage 50 in the vertically directed portion 26 of the base 20. The forward end of the screw of the micrometer 56 projects forwardly beyond the front face of the vertically directed portion 26 of the base 20 and extends into the recess 88 to engage a ball 90, which is held within the conical inner end of that recess by a cement 92. That ball coacts with that forward end of that screw to adjustably set the spacing between the confronting faces of the upper right-hand areas of the mounting plate 70 and of the vertically directed portion 26 of the base 20.

The numeral 94 denotes a generally cylindrical recess in the mounting plate 70, and that recess has a conical inner end, as shown by FIG. 2. The recess 94 is disposed in register with the cylindrical passage 58 which receives the barrel of the micrometer 66; and the forward end of the screw of that micrometer projects forwardly beyond the front face of the vertically directed portion 26 of the base 20 and extends into the recess 94 to engage a ball 96, which is held within the conical inner end of that recess by a cement 98. That ball coacts with that forward end of that screw to adjustably set the spacing between the confronting faces of the lower left-hand areas of the mounting plate 70 and of the vertically directed portion 26 of the base 20.

It will be noted that the axes of the passages 32, 38, 40, 50 and 58 are all parallel to each other and are all perpendicular to the front face of the vertically directed portion 26 of the base 20. Also, it will be noted that the axes of the passages 71 and 80 and of the recesses 78, 88 and 94 are all parallel to each other and are all perpendicular to the front face of the mounting plate 70. Further, it will be noted that the micrometers 56 and 66 are adjacent two of the apexes of a quadrilateral and that the balls on the pins 44 and 46 are adjacent the other two apexes of that quadrilateral The numeral 100 denotes flexible pads which are disposed between the mounting plate 70 and an optical element 102, such as a mirror, which is disposed forwardly of that mounting plate. There are three of those flexible pads, they are adhesive in nature, and they will adhere to the front face of the mounting plate 70 and to the rear face of the optical element 102. One material of which the flexible pads 100 can be made is a silicone rubber adhesive; and that material is desirable because it is flexible, is long-lived, and provides a desirable degree of holding power. One of the flexible pads 100 is disposed close to, but below the level of, the aligned passages 32 and 71, respectively, in the base 20 and in the mounting plate 70, a second of those flexible pads is disposed close to, but below the level of, the aligned passage 50 and recess 88, respectively, in that base and in that mounting plate, and the third of those flexible pads is disposed close to the lower edge of the mounting plate 70 at a point intermediate the webs 28, as shown by FIG. 3. Those three pads provide three points of support between the optical element 102 and the mounting plate 70; and those three pads define the apexes of an equilateral triangle. The pads 100 are desirable because they make it possible to secure the optical element 102 to the mounting plate 70 without subjecting that optical element to stresses and strain; and they also make it possible to secure that optical element to that mounting plate without overlying or obscuring any part of the front surface of that optical element. In addition, those pads will keep any changes in the mounting plate 70, which can be induced by aging or by changing temperatures, from inducing strains or looseness in the optical element 102.

The numeral 104 denotes a cover which can be used to overlie and enclose the mount and the optical element 102 supported thereby. That cover has an opening therein through which the handle 30 on that mount will project; and hence that opening enables a user to grip the handle 30 and raise that mount and cover as a unit.

The forward end of the screw of the micrometer 56 will coact with the ball 90 to set an adjustable, minimum distance between the confronting faces of the upper right-hand areas of the mounting plate 70 and of the vertically directed portion 26 of the base 20; and, similarly, the forward end of the screw of the micrometer 66 will coact with the ball 96 to set an adjustable, minimum distance between the confronting faces of the lower left-hand areas of that mounting plate and of that vertically directed portion. The helical extension spring 86 will urge the confronting faces of the lower right-hand areas of the mounting plate 70 and of the vertically directed portion 26 of the base 20 toward each other; and, in doing so, will press the ball 90 against the forward end of the screw of the micrometer 56 and will press the ball 96 against the forward end of the screw of the micrometer 66. The mounting plate 70 will tend to tilt about that diameter thereof which intersects the axes of the cylindrical passages 50 and 58; but the ball on the pin 44 will coact with the frustoconical shoulder 76 to fix the maximum spacing between the confronting faces of the upper left-hand areas of that mounting plate and of the vertically directed portion 26 of the base 20. The overall result is that the helical extension spring 86 causes the balls 90 and 96 to apply rearwardly directed forces to the forward ends of the screws of the micrometers 56 and 66, respectively, and causes the frustoconical shoulder 76 to apply forwardly directed forces to the ball on the pin 44; and those forces completely obviate any "play" between the mounting plate 70 and the vertically directed portion 26 of the base 20. The engagement between the ball on the pin 46 and the recess 78 will coact with the engagement between the frustoconical shoulder 76 and the ball on the pin 44 to hold the balls 90 and 96 in register with the forward ends of the screws of the micrometers 56 and 66, respectively. Consequently, the mounting plate 70 will be held in register with, but spaced forwardly of, the vertically directed portion 26 of the base 20.

Whenever it becomes desirable to adjust the position of the mounting plate 70—and the position of the optical horizontally directed, 102—relative to the vertically directed portion 26 vertically directed the base 20, the screws of one or both of the micrometers 56 and 66 will be rotated. Rotation of vertically directed screw of the micrometer 56 in one direction will cause the right-hand edge of the mounting plate 70 to move forwardly relative to the vertically directed portion 26 of the base 20, and the helical extension spring 86 will yield to permit that movement to occur; whereas rotation of that screw in the opposite direction will enable that spring to move that right-hand edge rearwardly relative to that vertically directed portion. Importantly, in either event, rotation of the screw of the micrometer 56 causes the mounting plate 70 to rotate about the vertical line which intersects the axes of the passages 32 and 58 in the vertically directed portion 26 of the base 20; and thus causes that mounting plate, and the optical element 102, to rotate about a vertical axis. Rotation of the screw of the micrometer 66 in one direction will vertically directed the bottom edge of the mounting plate 70 to move forwardly relative to the vertically directed portion 26 of the base 20; and the helical extension spring 86 will yield to permit that movement to occur; whereas rotation of that screw in the opposite direction will enable that spring to move that bottom edge rearwardly relative to that vertically directed portion. Importantly, in either event, rotation of the screw of the micrometer 66 causes the mounting plate 70 to rotate about the horizontal line which intersects the axes of the passages 32 and 50 in the vertically directed portion 26 of the base 20; and thus causes that mounting plate, and the optical element 102, to rotate about an axis which is displaced ninety degrees from the axis about which that mounting plate and that optical element rotate when the screw of the micrometer 56 is rotated. Importantly, the two axes about which the optical element 102 can be rotated are essentially independent axes.

The screws of the micrometers 56 and 66 can be rotated at different times, or they can be rotated simultaneously. Further, one of those screws can be rotated so the forward end thereof moves forwardly relative to the vertically directed portion 26 while the other of those screws is rotated so the forward end therefore moves rearwardly relative to that vertically directed portion. As a result, it should be apparent that the mount of the present invention can provide any desired adjustment of the position of the optical element 102 about either or both of two orthogonal axes—while obviating all "play" between that optical element 102 and the base 20.

The mount provided by the present invention is simple because it has only a limited number of parts; and it is inexpensive because it uses commercially available micrometers as the adjusting elements thereof. Specifically, the mount provided by the present invention has a base, two pins with balls at the forward ends thereof, two micrometers, two balls, a helical extension spring, two pins for that spring, three set screws, a mounting plate 70, and three flexible pads. Yet, although that mount is simple and inexpensive, it can provide extremely precise adjustments in the position of the optical element 102—the primary limit on the precision attainable with that mount being the precision capability of the micrometers 56 and 66.

Whereas the drawing and accompanying description have shown and described a preferred embodiment of the present invention it should be apparent to those skilled in the art that various changes may be made in the form of the invention without affecting the scope thereof.

I claim:

1. A mount for an optical element which comprises:
   a base that is stationary during adjustment of said mount for said optical element,
   a mounting plate that is movable relative to said base during adjustment of said mount for said optical element,
   interacting surfaces carried by said base and by said mounting plate providing an essentially fixed spacing between a predetermined area of said base and a predetermined area of said mounting plate, further interacting surfaces carried by said base and by said mounting plate which include a precisely adjustable means and which provide a precisely adjustable spacing between a second predetermined area of said base and a second predetermined area of said mounting plate, additional interacting surfaces carried by said base and by said mounting plate which include a second precisely adjustable means and which provide a precisely adjustable spacing between a third predetermined area of said base and a third predetermined area of said mounting plate, the first said interacting surfaces and said further interacting surfaces coacting to define an axis, and said second precisely adjustable means being adjustable to rotate said mounting plate about said axis, the first said interacting surfaces and said additional interacting surfaces coacting to define a second axis which is angularly displaced from the first said axis, and the first said precisely adjustable means being adjustable to rotate said mounting plate about said second axis, said further interacting surfaces providing restraint to movement of said mounting plate in a direction normal to said mounting plate but providing essentially no restraint to movement of said mounting plate in its own plane relative to said base, said additional interacting surfaces providing restraint to movement of said mounting plate in said direction normal to said mounting plate but providing essentially no restraint to movement of said mounting plate in its own plane relative to said base, and still further interacting surfaces carried by said base and by said mounting plate which coact with the first interacting surfaces to prevent rotation of said mounting plate in its own plane relative to said base, said still further interacting surfaces providing essentially no restraint to movement of said mounting plate in said direction normal to said mounting plate.

2. A mount for an optical element which comprises:

a base that is stationary during adjustment of said mount for said optical element, a mounting plate that is movable relative to said base during adjustment of said mount for said optical element, interacting surfaces carried by said base and by said mounting plate providing an essentially fixed spacing between a predetermined area of said base and a predetermined area of said mounting plate, further interacting surfaces carried by said base and by said mounting plate which include a precisely adjustable means and which provide a precisely adjustable spacing between a second predetermined area of said base and a second predetermined area of said mounting plate, additional interacting surfaces carried by said base and by said mounting plate which include a second precisely adjustable means and which provide a precisely adjustable spacing between a third predetermined area of said base and a third predetermined area of said mounting plate, the first said interacting surfaces and said further interacting surfaces coacting to define an axis, and said second precisely adjustable means being adjustable to rotate said mounting plate about said axis, the first said interacting surfaces and said additional interacting surfaces coacting to define a second axis which is angularly displaced from the first said axis, and the first said precisely adjustable means being adjustable to rotate said mounting plate about said second axis, said further interacting surfaces providing restraint to movement of said mounting plate in a direction normal to said mounting plate but providing essentially no restraint to movement of said mounting plate in its own plane relative to said base, said additional interacting surfaces providing restraint to movement of said mounting plate in said direction normal to said mounting plate but providing essentially no restraint to movement of said mounting plate in its own plane relative to said base, and still further interacting surfaces carried by said base and by said mounting plate which coact with the first said interacting surfaces to prevent rotation of said mounting plate in its own plane relative to said base, the first said interacting surfaces including a ball and a recessed surface engaged by said ball, said ball and said recessed surface being spaced laterally away from the center of said mounting plate, and said still further interacting surfaces including a ball and a recessed surface engaged by said ball, said ball and said recessed surface of said still further interacting surfaces being spaced laterally away from said center of said mounting plate.

3. A mount for an optical element which comprises:

a base that is stationary during adjustment of said mount for said optical element, a mounting plate that is movable relative to said base during adjustment of said mount for said optical element, interacting surfaces carried by said base and by said mounting plate providing an essentially fixed spacing between a predetermined area of said base and a predetermined area of said mounting plate, further interacting surfaces carried by said base and by said mounting plate which include a precisely adjustable means and which provide a precisely adjustable spacing between a second predetermined area of said base and a second predetermined are a of said mounting plate, additional interacting surfaces carried by said base and by said mounting plate which include a second precisely adjustable means and which provide a precisely adjustable spacing between a third predetermined area of said base and a third predetermined area of said mounting plate, the first said interacting surfaces and said further interacting surfaces coacting to define an axis, and said second precisely adjustable means being adjustable to rotate said mounting plate about said axis, the first said interacting surfaces and said additional interacting surfaces coacting to define a second axis which is angularly displaced from the first said axis, and the first said precisely adjustable means being adjustable to rotate said mounting plate about said second axis, said further interacting surfaces providing restraint to movement of said mounting plate in a direction normal to said mounting plate but providing essentially no restrain to movement of said mounting plate in its own plane relative to said base, said additional interacting surfaces providing restraint to movement of said mounting plate in said direction normal to said mounting plate but providing essentially no restrain to movement of said mounting plate in its own plane relative to said base, and still further interacting surfaces carried by said base and by said mounting plate which coact with the first said interacting surfaces to prevent rotation of said mounting plate in its own plane relative to said base, the first said and said still further interacting surfaces being adjacent two of the corners of a quadrilateral, and the first said and said second precisely adjustable means being adjacent the other two corners of said quadrilateral.

4. A mount for an optical element which comprises:

a base that is stationary during adjustment of said mount for said optical element, a mounting plate that is movable relative to said base during adjustment of said mount for said optical element, interacting surfaces carried by said base and by said mounting plate providing an essentially fixed spacing between a predetermined area of said base and a predetermined area of said mounting plate, further interacting surfaces carried by said base and by said mounting plate which include a precisely adjustable means and which provide a precisely adjustable spacing between a second predetermined area of said base and a second predetermined area of said mounting plate, additional interacting surfaces carried by said base and by said mounting plate which include a second precisely adjustable means and which provide a precisely adjustable spacing between a third predetermined area of said base and a third predetermined area of said mounting plate, the first said interacting surface and said further interacting surfaces coacting to define an axis, and said second precisely adjustable means being adjustable to rotate said mounting plate about said axis, the first said interacting surfaces and said additional interacting surfaces coacting to define a second axis which is angularly displaced from the first said axis, and the first said precisely adjustable means being adjustable to rotate said mounting plate about said second axis, said further interacting surfaces providing restraint to movement of said mounting plate in a direction normal to said mounting plate but providing essentially no restraint to movement of said mounting plate in its own plane relative to said base, said additional interacting surfaces providing restraint to movement of said mounting plate in said direction normal to said mounting plate but providing essentially no restraint to movement of said mounting plate in its own plane relative to said base, and still further interacting surfaces carried by said base and by said mounting plate which coact with the first said interacting surfaces to prevent rotation of said mounting plate in its own plane relative to said base, the first said interacting surfaces including a ball on said base and a recessed surface on said mounting plate, the first said precisely adjustable means including a micrometer mounted on said base and a ball mounted on said mounting plate, said second precisely adjustable means including a micrometer mounted on said base and a ball mounted on said mounting plate, and said still further interacting surfaces including a ball on said base and a recessed surface on said mounting plate.

5. A mount for an optical element which comprises:

a base that is stationary during adjustment of said mount for said optical element, a mounting plate that is movable relative to said base during adjustment of said mount for said optical element, interacting surfaces carried by said base and by said mounting plate providing an essentially fixed spacing between a predetermined area of said base and a predetermined area of said mounting plate, further interacting surfaces carried by said base and by said mounting plate which include a precisely adjustable means and which provide a precisely adjustable spacing between a second predetermined area of said base and a second predetermined area of said mounting plate, additional interacting surfaces carried by said base and by said mounting plate which include a second precisely adjustable means and which provide a precisely adjustable spacing between a third predetermined area of said base and a third predetermined area of said mounting plate, the first said interacting surfaces and said further interacting surfaces coacting to define an axis, and said second precisely adjustable means being adjustable to rotate said mounting plate about said axis, the first said interacting surfaces and said additional interacting surfaces coacting to define a second axis which is angularly displaced from the first said axis, and the first said precisely adjustable means being adjustable to rotate said mounting plate about said second axis, said further interacting surfaces providing restraint to movement of said mounting plate in a direction normal to said mounting plate but providing essentially no restraint to movement of said mounting plate in its own plane relative to said base, said additional interacting surfaces providing restraint to movement of said mounting plate in said direction normal to said mounting plate but providing essentially no restraint to movement of said mounting plate in its own plane relative to said base, and still further interacting surfaces carried by said base and by said mounting plate which coact with the first said interacting surfaces to prevent rotation of said mounting plate in its own plane relative to said base, the first said interacting surfaces including a ball on said base and a recessed surface on said mounting plate, the first said precisely adjustable means including a micrometer mounted on said base and a ball mounted on said mounting plate, said second precisely adjustable means including a micrometer mounted on said base and a ball mounted on said mounting plate, said still further interacting surfaces including a ball on said base and a recessed surface on said mounting plate, and a resilient element which holds said balls of the first said and said second precisely adjustable means against the screws of the micrometers of said first said and second precisely adjustable means and also holds said recessed surface of the first said interacting surfaces against the ball of said first said interacting surfaces.

6. A mount for an optical element which comprises:

a base that is stationary during adjustment of said mount for said optical element, a mounting plate that is movable relative to said base during adjustment of said mount for said optical element, interacting surfaces carried by said base and by said mounting plate providing an essentially fixed spacing between a predetermined area of said base and a predetermined area of said mounting plate, further interacting surfaces carried by said base and by said mounting plate which include a precisely adjustable means and which provide a precisely adjustable spacing between a second predetermined area of said base and a second predetermined area of said mounting plate, additional interacting surfaces carried by said base and by said mounting plate which include a second precisely adjustable means and which provide a precisely adjustable spacing between a third predetermined area of said base and a third predetermined area of said mounting plate, the first said interacting surfaces and said further interacting surfaces coacting to define an axis, and said second precisely adjustable means being adjustable to rotate said mounting plate about said axis, the first said interacting surfaces and said additional interacting surfaces coacting to define a second axis which is angularly displaced from the first said axis, and the first said precisely adjustable means being adjustable to rotate said mounting plate about said second axis, the first said interacting surfaces including a ball and a recessed surface engaged by said ball, the first said precisely adjustable means including a micrometer and a bearing area engaged by the screw of said micrometer, said second precisely adjustable means including a micrometer and a bearing area engaged by the screw of said micrometer, and a resilient means holding said bearing areas of the first said and said second precisely adjustable means against the screws of the micrometers of said first said and said second precisely adjustable means and also holding said recessed surface of the first said interacting surfaces against the ball of said first said interacting surfaces, and still further interacting surfaces carried by said base and by said mounting plate which coact with the first said interacting surfaces to prevent rotation of said mounting plate in its own plane relative to said base, said resilient means being located adjacent said still further interacting surfaces.

7. A mount for an optical element which comprises:

a base that is stationary during adjustment of said mount for said optical element, a mounting plate that is movable relative to said base during adjustment of said mount for said optical element, interacting surfaces carried by said base and by said mounting plate providing an essentially fixed spacing between a predetermined area of said base and a predetermined area of said mounting plate, further interacting surfaces carried by said base and by said mounting plate which include a precisely adjustable means and which provide a precisely adjustable spacing between a second predetermined area of said base and a second predetermined area of said mounting plate, additional interacting surfaces carried by said base and by said mounting plate which include a second precisely adjustable means and which provide a precisely adjustable spacing between a third predetermined area of said base and a third predetermined area of said mounting plate, the first said interacting surfaces and said further interacting surfaces coacting to define an axis, and said second precisely adjustable means being adjustable to rotate said mounting plate about said axis, the first said interacting surfaces and said additional interacting surfaces coacting to define a second axis which is angularly displaced from the first said axis, and the first said precisely adjustable mans being adjustable to rotate said mounting plate about said second axis, resilient means applying forces to said base and to said mounting plate which bias said mounting plate for movement relative to said base, said resilient means being spaced from said first said interacting surfaces, from said further interacting surfaces, and from said additional interacting surfaces, said resilient means applying forces to said base and to said mounting plate, adjacent said first said interacting surfaces, which urge said base and said mounting plate for movement in a predetermined direction relative to each other, said resilient means applying forces to said base and to said mounting plate, adjacent said further interacting surfaces, which urge said base and said mounting plate for movement in the opposite direction relative to each other, said resilient means applying forces to said base and to said mounting plate, adjacent said additional interacting surfaces, which urge said base and said mounting plate for movement in said opposite direction relative to each other, and still further interacting surface carried by said base and by said mounting plate which coact with the first said interacting surfaces to prevent rotation of said mounting plate in its own plane relative to said base, the first said precisely adjustable means including a micrometer and a bearing area engaged by the screw of said micrometer, said second precisely adjustable means including a micrometer and a bearing area engaged by the screw of said micrometer, said resilient means being located adjacent said still further interacting surfaces.